June 29, 1926.
C. C. CUNNINGHAM
NUT LOCK
Filed April 1, 1924
1,590,888
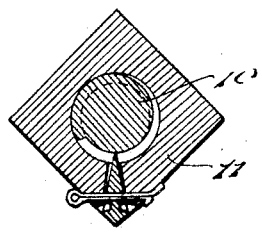
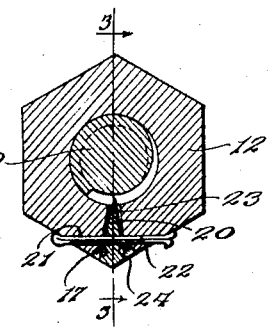
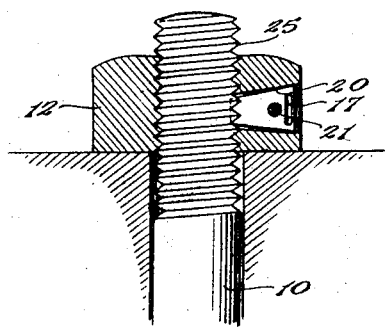
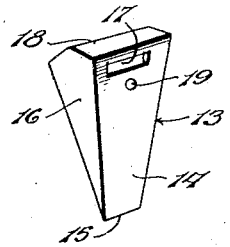
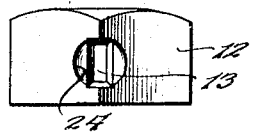
Inventor
C. C. Cunningham
By Lacey & Lacey, Attorneys Patented June 29, 1926.

1,590,888

UNITED STATES PATENT OFFICE.

CORWIN C. CUNNINGHAM, OF TORONTO, KANSAS.

NUT LOCK.

Application filed April 1, 1924. Serial No. 703,516.

My invention relates to a device for securely locking a nut on a threaded bolt so that the nut cannot unscrew unless forcible means are applied to remove the lock.

One object of the present invention is to provide a positive lock that can be applied with the nut in any position on the bolt. In other words, it is immaterial whether the nut is drawn up tightly on the bolt or not, as the lock will engage the thread of the bolt in any place along its surface.

Ordinarily nut locks are effective only to a certain extent and for a certain time and under particular conditions and are apt to loosen if subjected to vibration or shocks. These disadvantages are entirely removed from the present invention as the nut will stay locked even under the most unfavorable conditions.

The nut lock is intended for universal service but is more particularly intended for the use by railroads both on the rolling stock and the permanent way. In this use of the nut lock it tends to make railroad traveling very safe as it is a well known fact that loosened bolts on the railroad tracks often are the cause of serious accidents. It is evident that a nut lock that loosens ever so little becomes ineffective and weakens the structure upon which it has been applied. The nut, forming the subject matter of the present invention, on the other hand, can be depended upon to stay in locked position without further attention or tightening at any time.

In the accompanying drawing one embodiment of the invention is illustrated, and—

Figure 1 is a transverse section of a square nut and bolt with the locking device in position;

Figure 2 is a view similar to Fig. 1 showing a hexagonal nut;

Figure 3 is a section along line 3—3 of Fig. 2;

Figure 4 is a perspective view of the locking wedge, and

Figure 5 is a front elevation of the nut and lock.

In the drawing, reference numeral 10 represents a bolt, reference numeral 11 a square nut and reference numeral 12 a hexagonal nut. As the locking device is the same whether a square, hexagonal or any other shape nut is used, it will be sufficient to describe the lock in connection with a hexagonal nut, as indicated in Figs. 2, 3, 4 and 5.

The wedge 13 has two plain faces 14 converging from the outer end of the wedge to form a sharp edge 15. The top and bottom faces 16 of the wedge are also plain and may be parallel or, as indicated in Fig. 4, also converging towards the edge 15. Near the heavy or outer end of the wedge each face 14 is provided with a groove 17 running parallel to the end face 18 of the wedge. These grooves constitute gripping recesses for removing the wedge from the nut. Transversely through the wedge is formed an aperture 19 the use of which will be described further on.

A seat 20 is provided for the wedge in the nut 12. This seat preferably enters the nut through one of the corners thereof and runs in radial direction into the bore of the nut. In some cases, however, it may be preferable to position the seat in one of the flat sides of the nut. The entering of the seat 20 through one of the corners of the nut has, however, the advantage of requiring a shorter cotter pin 21 for locking the key in position and in addition permits the arms of the cotter key to have their free end portions turned back against the side of the nut and very securely hold the cotter key in place. Suitable apertures 22 are formed in the corner portion of the nut and register with the aperture 19 in the wedge when the latter is in position in the seat 20. The seat is tapered throughout a portion of its length to correspond with the wedge 13 but is slightly wider at its inner end than the corresponding width of the wedge so as to provide space at opposite sides of the inner end portions of the wedge as shown at 23. The wedge is made of hard steel and its sharp edge 15 is of sufficient width to engage at least two of the threads of the bolt. By having the inner end of the wedge spaced from the walls of the seat arm as provided into which the metal of the bolt threads may bulge when the wedge is driven into place.

On each side of the outer end of the seat 20 in the nut is formed a small recess 24 provided for the purpose of accommodating the points of a pair of pincers adapted to engage in the grooves 17 when the wedge is to be removed from the nut the grooves 17 registering with the recesses 24, as shown in Figs. 1 and 2.

When the nut has been drawn up tightly on the bolt, the wedge 13 is inserted in its seat. By means of a hard blow on the end face 18 of the wedge, the same is driven tightly into its seat while the sharp edge 15 cuts into the threads of the bolt, preferably to the bottom thereof, in which position the opening 19 registers with the openings 22. A fastener such as the cotter pin 21, is then inserted through the apertures 19 and 22 and the protruding free end portions of its arms are spread apart to prevent it from sliding out of place. It will now be evident that the cotter pin prevents the wedge from slipping out of its seat so that the engagement between the edge 15 thereof and the threads of the bolt is permanent and secure.

If the nut is to be removed, the ends of the cotter pin 21 are first straightened out or broken off. The cotter pin is thereupon drawn out from the apertures 19 and 22 and finally the wedge removed by gripping the same by a pair of pincers engaging in the grooves 17, room being provided for the pincers to enter the grooves because of the recesses 24 formed near the seat 21. When the nut thereupon is loosened, the burs on the bolt threads will be sheared off.

In cases where it is necessary to occasionally remove the nut and reset it, it may be given a harder temper than the bolt so that it can readily shear the burs on the bolt threads when being turned. In this manner, the threads will be dressed every time the nut is turned. The wedge should preferably be of harder material than the bolt in all instances.

Having thus described the invention, what is claimed as new is:

1. A nut lock structure comprising a nut having a threaded bore adapted to receive a threaded bolt, said nut having a radially directed seat rectangular in cross section and opening into the bolt receiving bore of the nut and having its outer end portion enlarged from opposite sides to form side recesses at the outer end of the seat, a wedge rectangular in cross section and inserted in said seat and having a sharpened inner edge disposed longitudinally of a bolt received in said bolt receiving bore to span and cut into the threads of the bolt, said wedge having its inner end portion spaced from opposed walls of the seat and having opposed side faces of its outer end portion provided with grooves disposed in facing relation to the recesses at the outer end of the seat when the wedge is inserted in the seat and driven into biting engagement with the bolt, and means to secure the wedge in the seat.

2. The combination with a bolt, of a polygonal nut threaded thereon and having a seat extending radial to the axis of its bolt opening and communicating at its inner end with said bolt opening, and, at its outer end, opening through the side of the nut at the juncture of two relatively adjacent faces of the nut, the said faces at opposite sides of the seat, being formed with recesses and with openings extending in alinement transversely of the seat, a wedge fitting within the seat and having its opposite side faces meeting to provide a sharp edge penetrating the thread of the bolt, the thicker end of the wedge substantially filling the outer end of the seat and being beveled to provide face portions flush with the said relatively adjacent faces of the nut, the wedge at its said thicker end, having a transverse opening, and a securing element fitted through the alined openings in the nut and the opening in the wedge, the said opposite side faces of the wedge, at the thicker end of the wedge, having grooves therein presented within the recesses in the faces of the nut.

In testimony whereof I affix my signature.

CORWIN C. CUNNINGHAM. [L. S.]